US 8,229,406 B2

United States Patent
Lee et al.

(10) Patent No.: US 8,229,406 B2
(45) Date of Patent: Jul. 24, 2012

(54) METHOD FOR PROVIDING A RECEIVER'S TERMINAL WITH MULTIMEDIA CONTENTS BEFORE A CALL IS CONNECTED

(75) Inventors: Won-Jun Lee, Seoul (KR); Seung-Ook Je, Seoul (KR); Su-Nyeon Kim, Yongin-si (KR); Jae-Young Park, Seoul (KR); Jin-Hong Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 643 days.

(21) Appl. No.: 12/374,780

(22) PCT Filed: Aug. 9, 2007

(86) PCT No.: PCT/KR2007/003825
§ 371 (c)(1),
(2), (4) Date: Jan. 22, 2009

(87) PCT Pub. No.: WO2008/018759
PCT Pub. Date: Feb. 14, 2008

(65) Prior Publication Data
US 2009/0203365 A1 Aug. 13, 2009

(30) Foreign Application Priority Data
Aug. 9, 2006 (KR) ........................ 10-2006-0075043

(51) Int. Cl.
*H04W 4/16* (2009.01)
(52) U.S. Cl. ..................................... 455/415; 379/88.19
(58) Field of Classification Search .................... 455/415
See application file for complete search history.

(56) References Cited

U.S. PATENT DOCUMENTS

| | | | | |
|---|---|---|---|---|
| 5,878,397 | A | * | 3/1999 | Stille et al. ..................... 455/466 |
| 6,337,986 | B1 | | 1/2002 | Charpentier et al. |
| 6,987,974 | B1 | * | 1/2006 | Mostafa et al. ............... 455/455 |

(Continued)

FOREIGN PATENT DOCUMENTS

JP 10-243098 9/1998

(Continued)

OTHER PUBLICATIONS

Japanese Office Action for 2009-523722 dated Jul. 4, 2011, citing the above reference(s).
International Search Report mailed Oct. 31, 2007 for PCT/KR2007/003825.
Chinese Office Action for application No. 200780026423.9, citing the attached reference(s).

(Continued)

*Primary Examiner* — Kamran Afshar
*Assistant Examiner* — Joseph Dean, Jr.
(74) *Attorney, Agent, or Firm* — Lowe Hauptman Ham & Berner, LLP

(57) ABSTRACT

Disclosed is a method for providing a target mobile station with a multimedia content such as audio or video content before a call an originating mobile station attempted to connect is answered by the target mobile station. A mobile communication network protocol for multimedia transmission between a target mobile station and a network is established before a called party receives a call, so that multimedia such as images or moving pictures may be sent to the target mobile station before the called party answers the call. In this way, the called party is able to enjoy a multimedia service before the phone call is connected. Moreover, if the multimedia is an audio or moving picture about a calling party, the called party can identify the calling party based on the multimedia.

24 Claims, 6 Drawing Sheets

U.S. PATENT DOCUMENTS

2003/0032414 A1 2/2003 Melaku et al.
2005/0195950 A1* 9/2005 Lee et al. .................. 379/88.19

FOREIGN PATENT DOCUMENTS

| JP | 2001-501388 | 1/2001 |
| JP | 2001-078271 | 3/2001 |
| KR | 10-2004-0076095 | 8/2004 |
| KR | 10-2004-0090875 | 10/2004 |
| KR | 10-2005-0036355 | 4/2005 |
| KR | 10-2005-0113416 | 12/2005 |
| WO | 2004/086782 | 10/2004 |
| WO | 2005055570 | 6/2005 |

OTHER PUBLICATIONS

3GPP: "3rd Generation Partnership Project; Technical Specification Group Services and System Aspects; Codec for circuit switched multimedia telephony service; Modifications to H.324(Release 9)"; 3GPP TS 26.111; 2009; pp. 1-13.

International Telecommunication Union; "Series H: Audiovisual and Multimedia Systems Infrastructure of audiovisual services—Systems and terminal equipment for audiovisual services Terminal for low bit-rate multimedia communication"; ITU-T Recommendation H.324(Previously CCITT Recommendation); Feb. 1998; 59 pages.

* cited by examiner

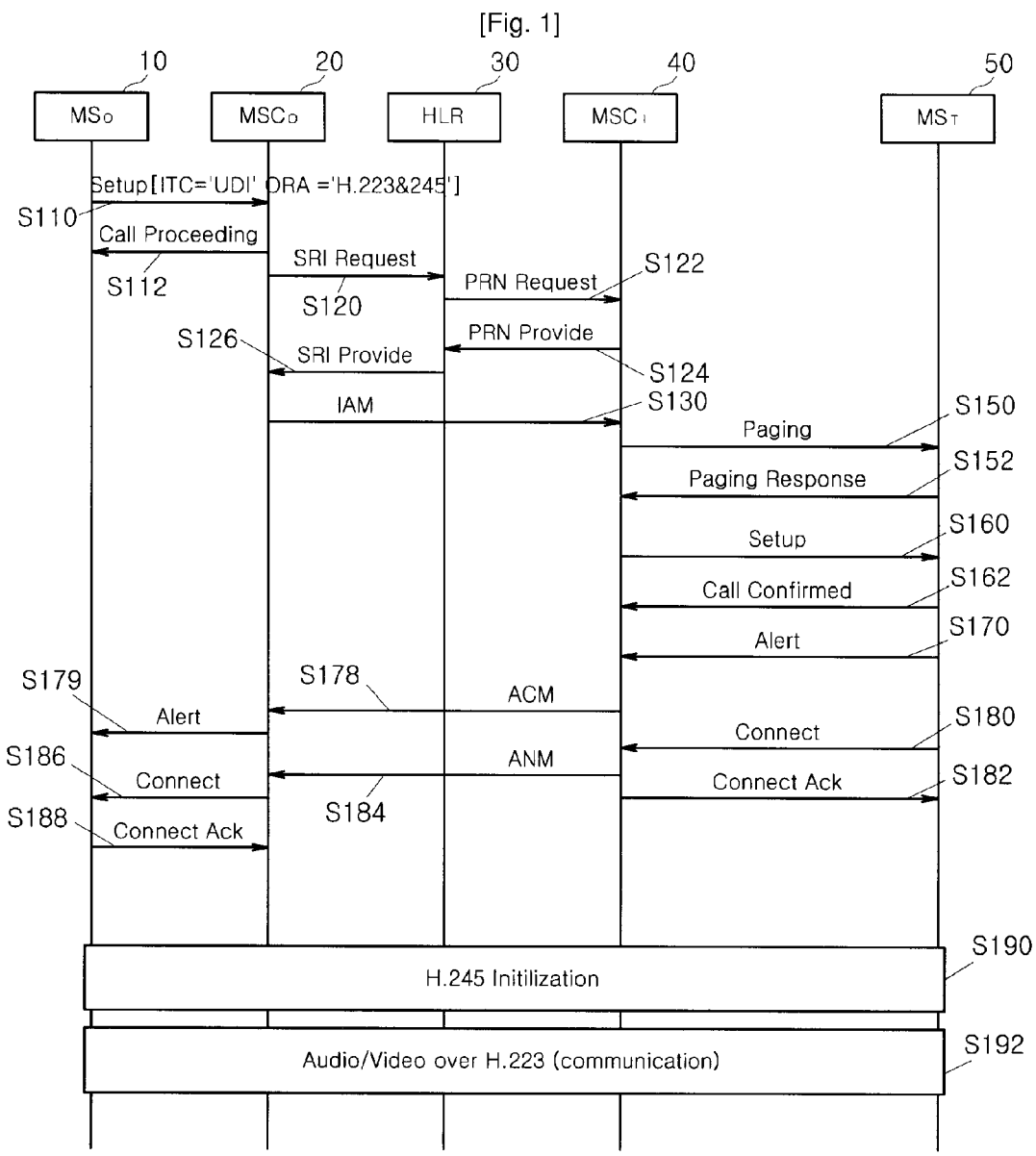

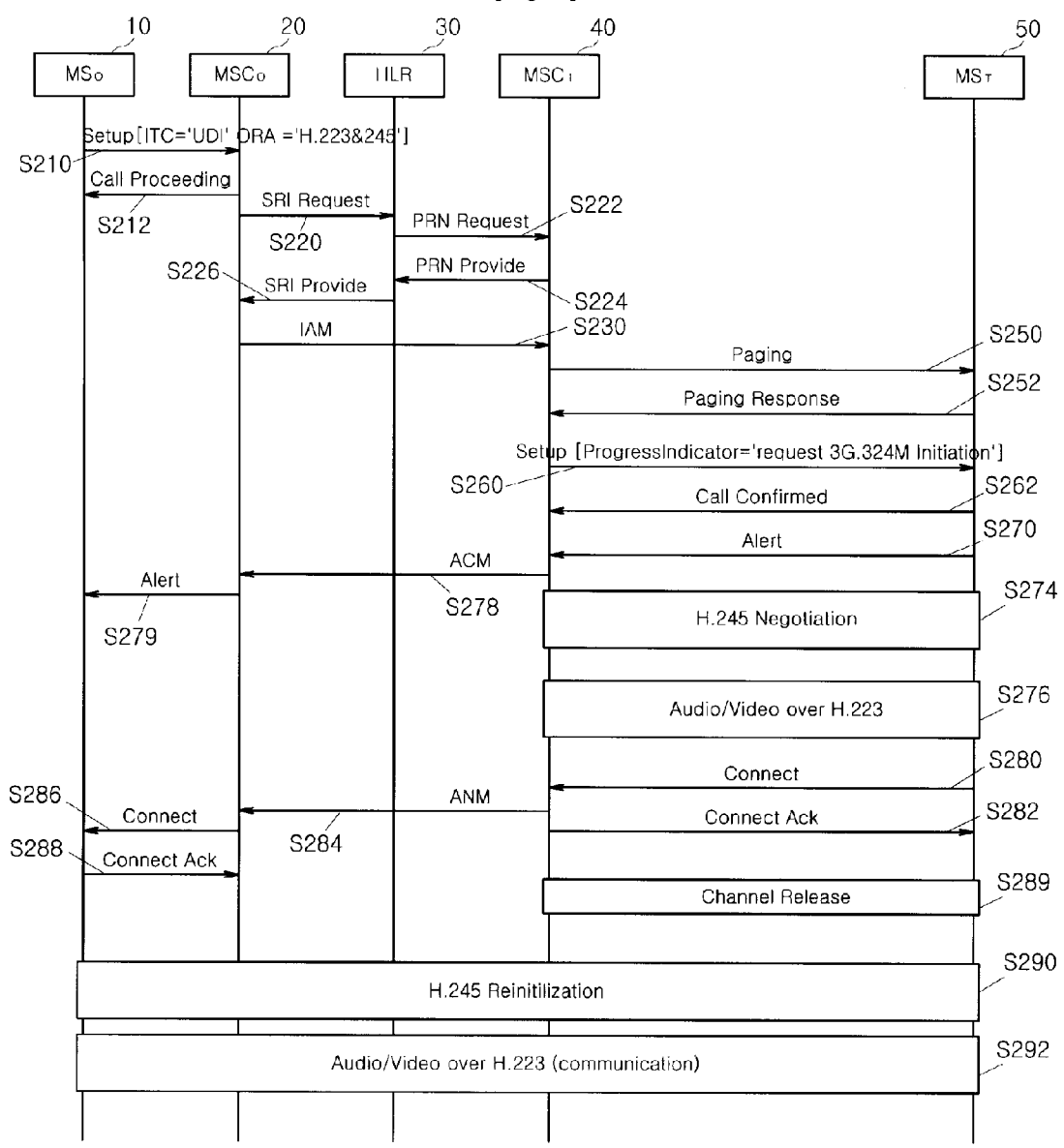

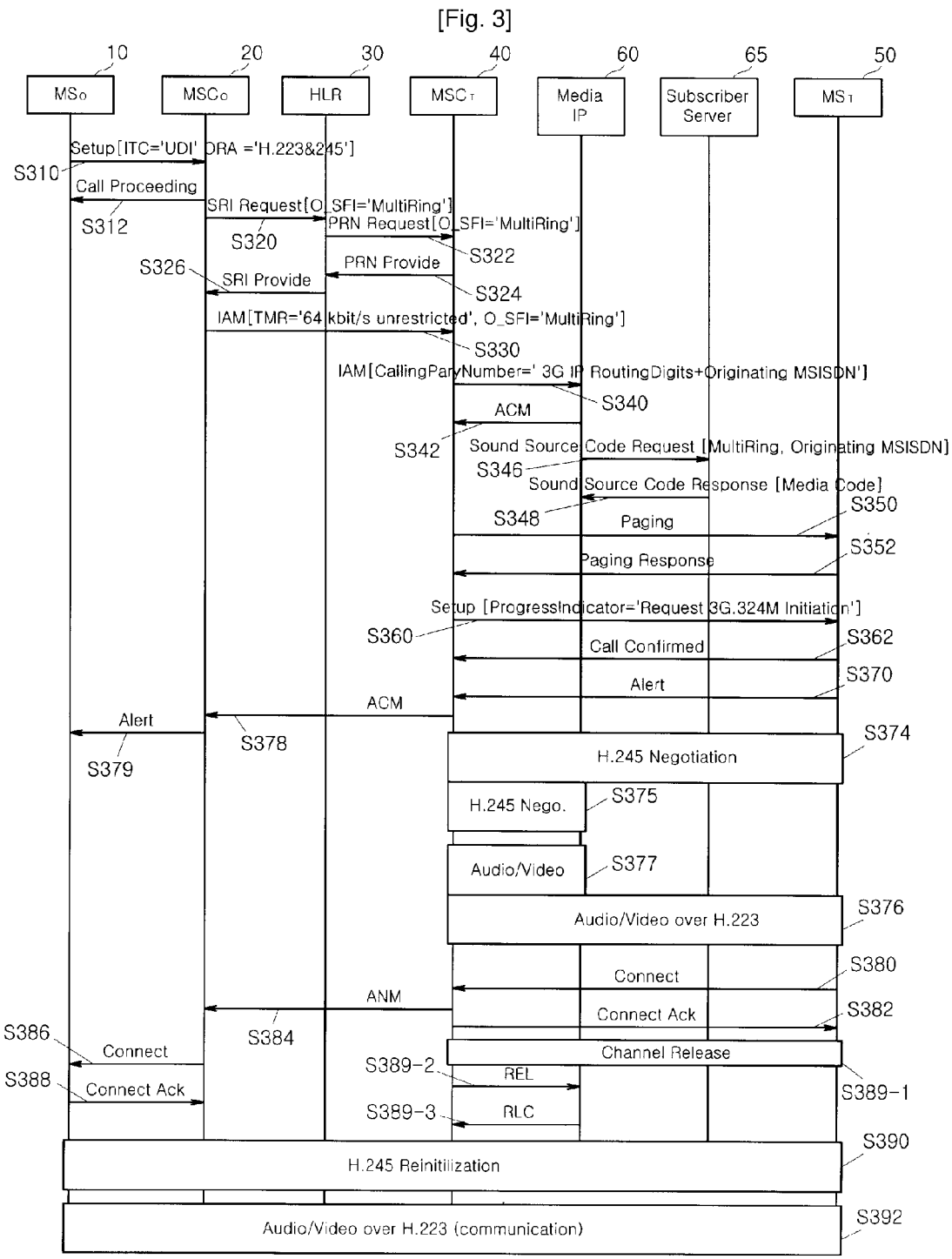
[Fig. 3]

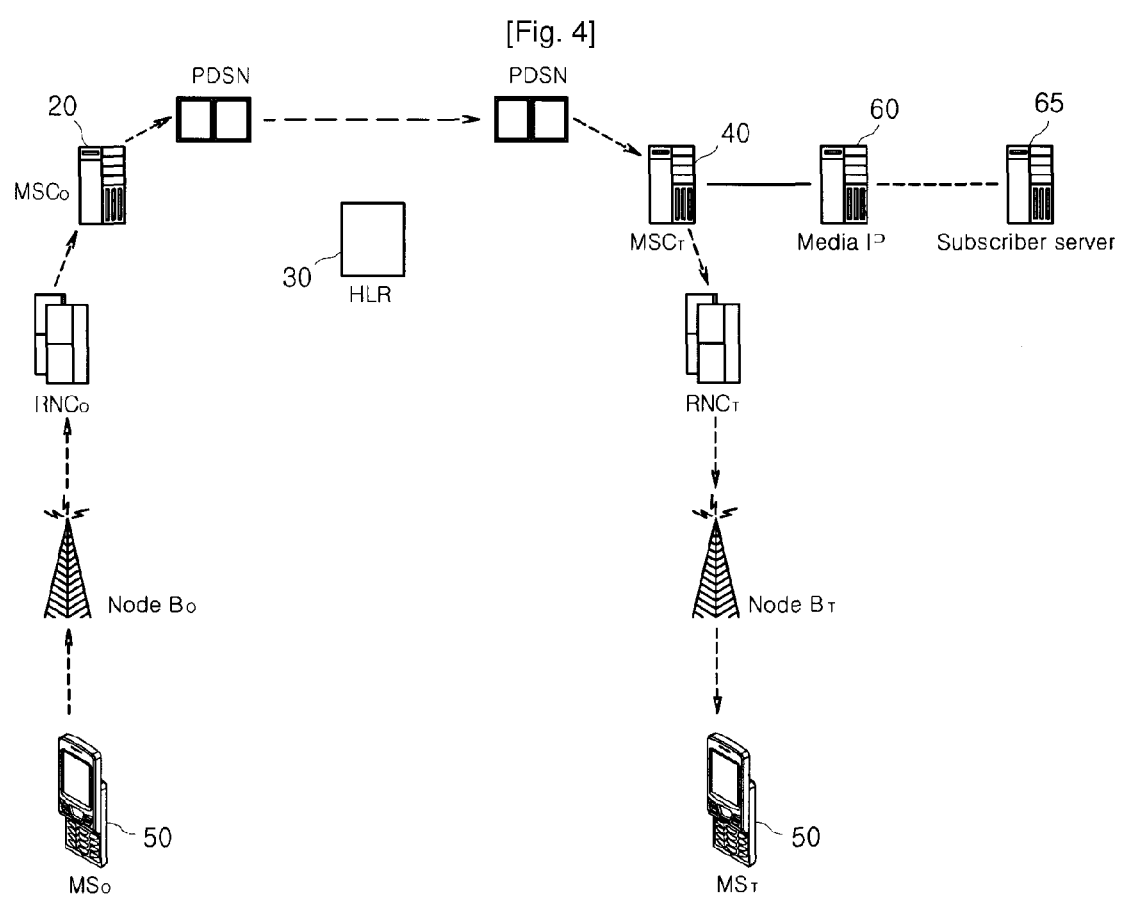

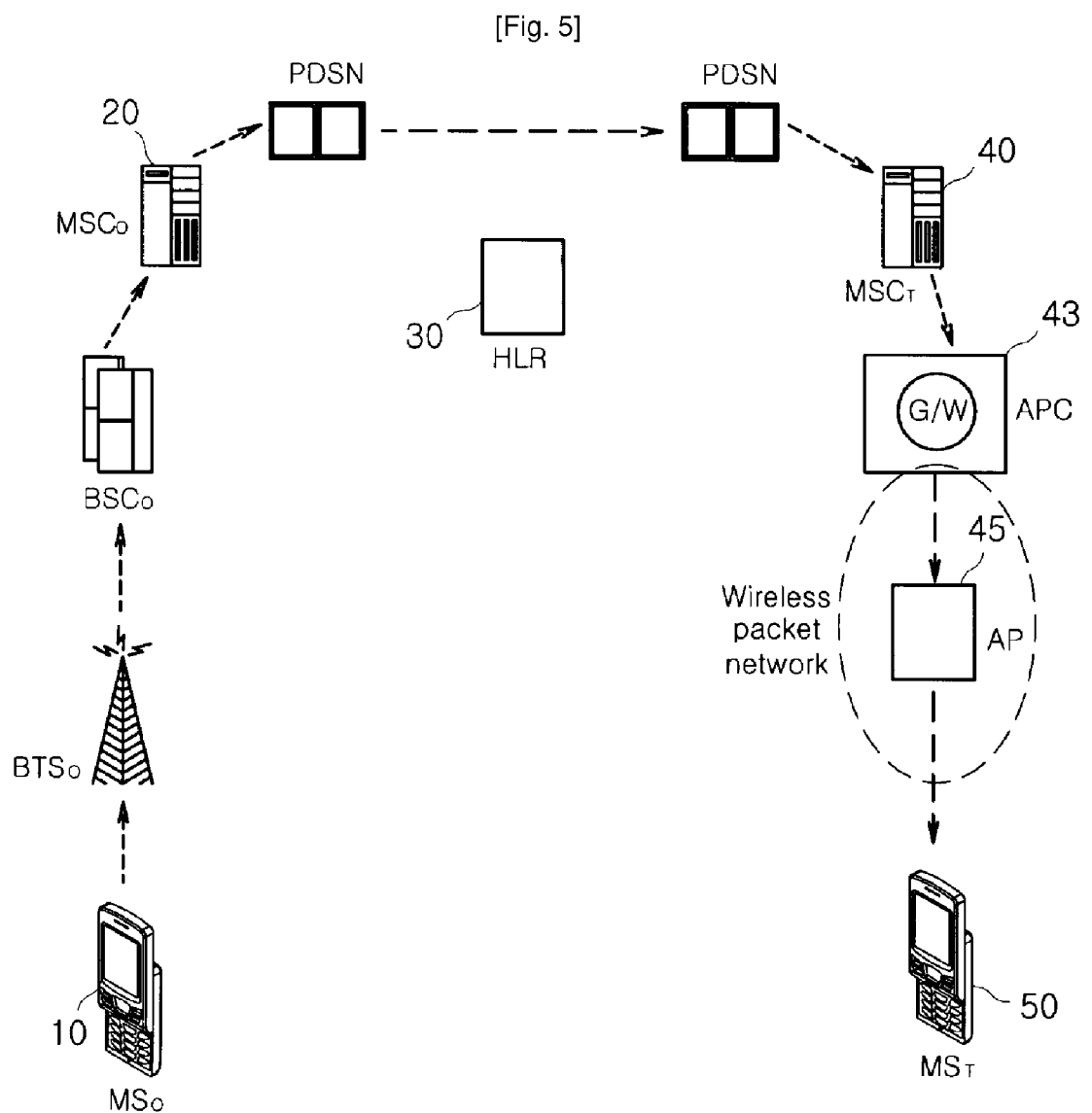
[Fig. 5]

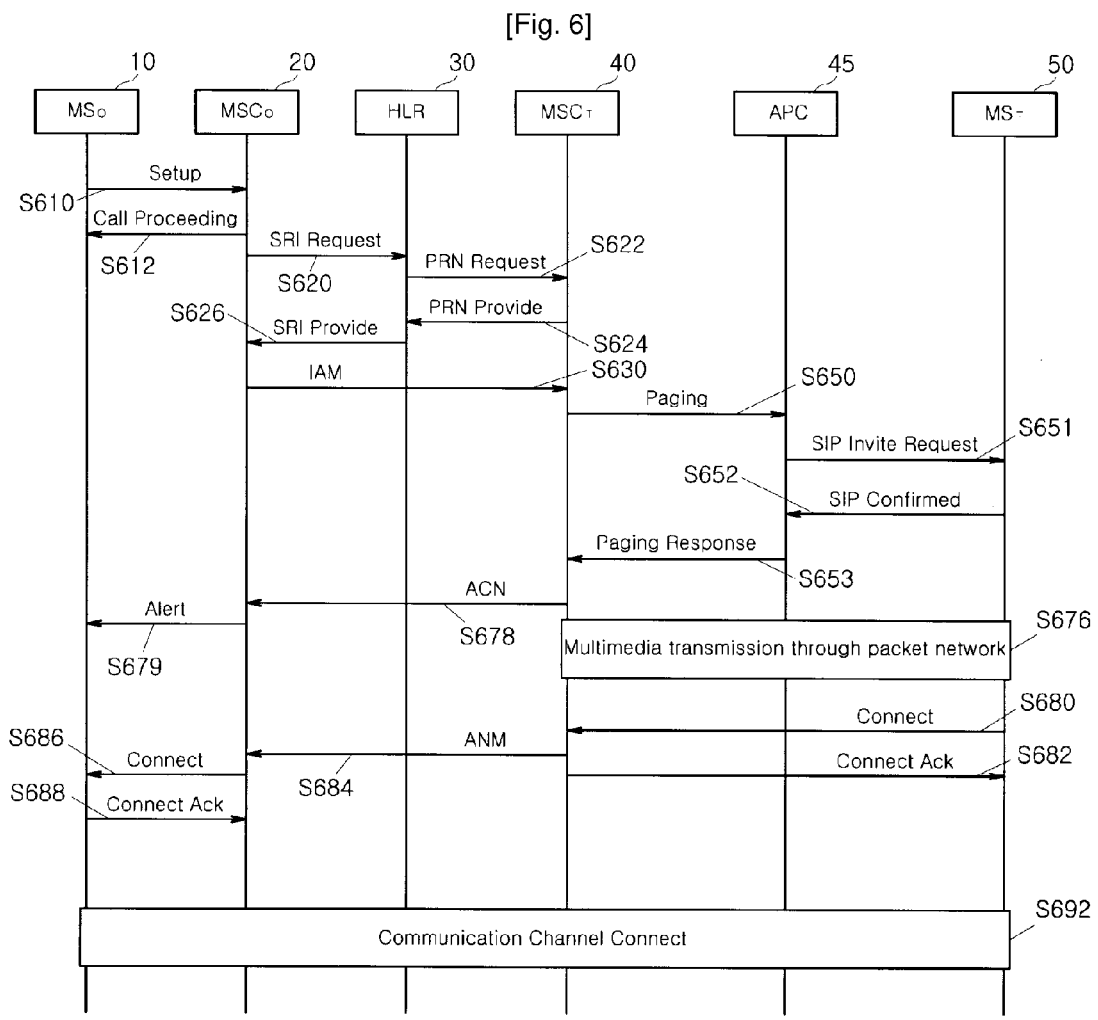

METHOD FOR PROVIDING A RECEIVER'S TERMINAL WITH MULTIMEDIA CONTENTS BEFORE A CALL IS CONNECTED

CROSS REFERENCE TO RELATED APPLICATION

This application claims the priority of Korean Patent Application No. 10-2006-0075043, filed on Aug. 9, 2006 in the KIPO (Korean Intellectual Property Office), the disclosure of which is incorporated herein in their entirety by reference. Further, this application is the National Phase application of International Application No. PCT/KR2007/003825, filed Aug. 9, 2007, which designates the United States and was published in English. Each of these applications is hereby incorporated by reference in their entirety into the present application.

TECHNICAL FIELD

The present invention relates to a method for providing a target mobile station, or a receiver's terminal, with multimedia contents such as audio or video content before the target mobile station answering a call requested from an originating mobile station in a mobile network.

BACKGROUND ART

FIG. 1 is a flow chart illustrating a conventional call processing for providing a video call over WCDMA based mobile communication network using the 3G.324M protocol.

When an Originating Mobile Station, $MS_O$ 10, makes a video call to a Target Mobile Station, $MS_T$ 50, a Setup message for call origination to enable the video call using the 3G.324M protocol is sent from the $MS_O$ 10 to an Originating Mobile Switching Center, $MSC_O$ 20 (S110). Within the Setup message, an Information Transfer Capability (ITC) value of the call is set to Unrestricted Digital Information (UDI) so as to enable the transfer of digital data, and an Other Rate Adaptation (ORA) field is set to the 3G.324M protocol. The 3G.324M protocol comprises H.223 protocol, a standard for multiplexing multimedia data, and H.245 protocol, a standard for system control.

Next, the $MSC_O$ 20 replies to the $MS_O$ 10 with a Call Proceeding message informing that it will proceed with the call (S112).

Moreover, in order to get the location information of the $MS_T$ 50 and connect the call thereto, the $MSC_O$ 20 sends a Send Routing Information (SRI) request to a home location register (HLR) 30 (S120).

In response to the SRI request, the HLR 30 sends a Provide Roaming Number (PRN) request to a Target Mobile Switching Center, $MSC_T$ 40, which the $MS_T$ 50 is connected to (S122).

As a response to the PRN request, the $MSC_T$ 40 transmits PRN information to the HLR 30 (S124). And as a response to the SRI request, the HLR 30 transmits SRI information, which is acquired from the PRN information, to the $MSC_O$ 20 (S126).

Then, the $MSC_O$ 20 finds out the location of the $MS_T$ 50 through the SRI information and transmits an initial address message (IAM) including ID information of the $MS_T$, such as a telephone number, to the $MSC_T$ 40 which the $MS_T$ 50 is connected to (S130). The IAM message requests the $MSC_T$ 40 to establish a circuit connection to reach the $MS_T$ 50.

Next, the $MSC_T$ 40 sends a Paging message to the $MS_T$ 50 in accordance with the IAM (S150), and the $MS_T$ 50 sends a Paging Response to the $MSC_T$ 40 (S152).

Afterwards, the $MSC_T$ 40 sends a Setup message to the $MS_T$ 50 (S160), and the $MS_T$ 50 sends the $MSC_T$ 40 a Call Confirmed message as a response (S162), followed by an Alert message (S170). In this manner, a traffic channel is established between the $MS_T$ 50 and $MSC_T$ 40.

Meanwhile, in response to the IAM message, the $MSC_T$ 40 sends the $MSC_O$ 20 an address complete message (ACM) indicating the acquisition of the $MS_T$ ID (S178), and the $MSC_O$ 20 sends the $MS_O$ 10 an Alert message for informing such (S179).

When the $MS_T$ 50 answers or receives the call in response to a call-incoming or ringing, it delivers a Connect message to the $MSC_T$ 40 (S180), and receives a Connect Ack message (S182).

In the meanwhile, after receiving the Connect message from the $MS_T$ 50, the $MSC_T$ 40 transmits an answer message (ANM) to the $MSC_O$ 20 (S184). Then, the $MSC_O$ 20 sends a Connect message to the $MS_O$ 10 (S186) and receives a Connect Ack message (S188).

In this manner, a call is connected between the $MS_O$ 10 and the $MS_T$ 50, and then a negotiation for video and audio channel setup and the like according to the H.245 protocol is made (S190), and audio and video data are transmitted by the H.223 protocol (S192).

However, in mobile communication services using the above way, an audio or video multimedia signal can only be sent to the called party, $MS_T$ 50, after the traffic channel is built between the $MS_O$ 10 and the $MS_T$ 50 (S170 through S179) and the called party receives the call (S180).

In other words, the conventional technology is not able to provide multimedia service while the $MS_T$ is still ringing.

DISCLOSURE OF INVENTION

Technical Problem

In the present invention, a mobile communication network protocol is established for multimedia transmission between a target mobile station and a network before a called party receives or answers a call, so that multimedia such as images or moving pictures may be sent to the target mobile station before the called party answers the call.

In this way, the called party is able to enjoy a multimedia service before the call is connected. Particularly, if the multimedia is an audio or moving picture related with a calling party, the called party can identify the calling party based on the multimedia.

Accordingly, the object of the invention is to provide a method for providing a target mobile station with multimedia contents before a call is connected over a mobile communication network.

Technical Solution

The present invention is related to a method for providing a target mobile station with multimedia contents such as audio or video content while the target mobile is still ringing, i.e., before a call that an originating mobile station requested to connect is answered by the target mobile station.

In the invention, the multimedia contents may be multimedia data incorporating audio and video, or multimedia data formed of audio or video only. The multimedia contents provided according to the invention is preset by a calling party and is stored in a mobile switching center of a mobile communication operator, a media IP (Intelligent Peripheral), or a subscriber server.

In detail, a method for providing a target mobile station with multimedia contents according to the invention comprises the steps of: (a) when the call is requested from the originating mobile station, an originating mobile switching center sending an initial address message (IAM) containing ID information of the target mobile station to a target mobile switching center; (b) the target mobile switching center sending a setup message to the target mobile station; (c) establishing a channel for multimedia transmission between the target mobile station and the target mobile switching center, in response to a command of the setup message; and (d) providing multimedia data stored in the target mobile switching center to the target mobile station.

Alternatively, multimedia contents being saved in a subscriber server, not in a switching center, may be provided to a target mobile station through media IP (Intelligent Peripheral). In such case, a method for providing a target mobile station with multimedia contents according to the invention comprises the steps of: (a) when the call is requested from the originating mobile station, an originating mobile switching center sending an initial address message (IAM) containing ID information of the target mobile station to a target mobile switching center; (b) the target mobile switching center sending a setup message to the target mobile station; (c) according to a command of the setup message, establishing a channel for multimedia transmission, between the target mobile station and the target mobile switching center, and between the target mobile switching center and a media IP (Intelligent Peripheral); and (d) the media IP providing the target mobile station with multimedia data.

In addition, the present invention provides a mobile communication system that uses a mobile communication protocol enabling multimedia transmission and provides a target mobile station with multimedia contents before a call an originating mobile station having attempted to connect is answered by the target mobile station. To this end, the system comprises: a media IP storing the multimedia content to be provided to the target mobile station and operating in cooperation with the target mobile switching center, wherein, before the call requested from the originating mobile station answered, a channel for multimedia transmission is established, between the media IP and the target mobile switching center, and between the target mobile switching center and the target mobile station, so as to provide multimedia content stored in the media IP to the target mobile station via the target mobile switching center.

Advantageous Effects

According to the invention, a mobile communication network protocol is established for multimedia transmission between a target mobile station and a network before a called party receives a call, so that multimedia such as images or moving pictures may be sent to the target mobile station before the called party answers the call. In this way, the called party is able to enjoy a multimedia service before the phone call is connected. Particularly, if the multimedia is an audio or moving picture about a calling party, the called party can identify the calling party based on the multimedia.

BRIEF DESCRIPTION OF THE DRAWINGS

The above and other objects and features of the present invention will become apparent from the following description of preferred embodiments, given in conjunction with the accompanying drawings, in which:

FIG. 1 is a flow chart illustrating a conventional call processing for providing a video call in a WCDMA based mobile communication network.

FIG. 2 is a flow chart illustrating a process for providing multimedia contents when an incoming video call is in queue before being answered, according to a first embodiment of the invention.

FIG. 3 is a flow chart illustrating a process for providing multimedia contents when an incoming video call is in queue before being answered, according to a second embodiment of the invention.

FIG. 4 shows the configuration of a communication system for use in the second embodiment of the invention where multimedia contents are provided when an incoming video call is in queue before being answered.

FIG. 5 shows the configuration of a communication system used for providing multimedia contents when an incoming call over an IP (Internet Protocol) network is in queue before being answered, according to a third embodiment of the invention.

FIG. 6 is a flow chart illustrating a process of providing multimedia contents when an incoming call over an IP network is in queue before being answered, which is applied to the third embodiment of the invention.

MODE FOR THE INVENTION

Hereinafter, preferred embodiments of the present invention will be described in detail with reference to the accompanying drawings. However, the present invention is not limited by the following embodiments.

The first and the second embodiments described below are exemplary call processing methods applied to a third generation mobile communication network based on WCDMA system using the 3G.324M protocol. The third embodiment described below is an exemplary call processing in a wireless packet network such as Internet Protocol network.

FIG. 2 is a flow chart illustrating a process for providing multimedia contents before an incoming video call is answered, according to a first embodiment of the invention.

The call processing shown in FIG. 2 is partly identical with the aforementioned conventional call processing for providing a video call over WCDMA based mobile communication network using the 3G.324M protocol. For example, at the step S210, an $MS_O$ 10 transmits to an $MS_T$ 50 a Setup message for initiating a video call using the 3G.324M protocol. At step S250, an $MSC_T$ 40 sends a Paging message to the $MS_T$ 50 in response to receiving the IAM, and at step S252, the $MS_T$ 50 sends a Paging Response to the $MSC_T$ 40 in response to the Paging. As such, the steps from S210 to S252 are identical to the aforementioned conventional call processing and will not be further explained hereafter.

After the $MS_T$ 50 sends the Paging Response (S252) to the $MSC_T$ 40 in response to the Paging, the $MSC_T$ 40 delivers a Setup message for call termination to the $MS_T$ 50 (S260). The Setup message used here includes a ProgressIndicator parameter, which is set to Request 3G.324M Initiation to initiate the 3G.324M protocol for a video call. That is, the $MSC_T$ 40 sends 3G.324M initiation command to the $MS_T$ 50 through the value of the ProgressIndicator parameter included in the Setup message, so as to enable H.245 negotiation to initiate immediately once a traffic channel to the $MS_T$ 50 is established.

The $MS_T$ 50 sends the $MSC_T$ 40 a Call Confirmed message (S262) and an Alert message (S270). And, in accordance with the 3G.324M initiation command, the $MS_T$ 50 attempts H.245 protocol setup and a channel based on the H.245 protocol is established between the $MSC_T$ 40 and $MS_T$ 50 (S274). Then, conforming to the H.223 protocol, the $MSC_T$ 40 provides, through the channel, the $MS_T$ 50 with default multimedia data or multimedia content a calling party has set in advance as early media (S276).

Therefore, video data such as a still image or moving image can be displayed on the $MS_T$ 50 while the $MS_T$ 50 is still ringing. Also, the $MS_T$ 50 may output multimedia data of a specific audio, instead of a basic ring-tone.

Meanwhile, the $MSC_T$ 40 sends the $MSC_O$ 20 an address complete message (ACM) indicating the ID of the $MS_T$ has been obtained (S278), and the $MSC_O$ 20 transmits an Alert message to the $MS_O$ 10 for informing such (S279).

After receiving or answering the incoming call, the $MS_T$ 50 transmits a Connect message to the $MSC_T$ 40 (S280) and receives a Connect Ack (S282).

In the meantime, after receiving the Connect message from the $MS_T$ 50, the $MSC_T$ 40 sends an answer message (ANM) to the $MSC_O$ 20 (S284), and then the $MSC_O$ 20 sends a Connect message to the $MS_O$ 10 (S286) and receives a Connect Ack (S288).

Once a call is connected between the $MS_O$ 10 and the $MS_T$ 50 as above, the channel for 3G.324M established between the $MSC_T$ 40 and the $MS_T$ 50 is released (S289). Afterwards, a negotiation for establishing audio and video communication channel(s) according to the H.245 protocol is performed between the $MS_O$ 10 and the $MS_T$ 50 (S290). Finally, audio and video data for the video call are transmitted using H.223 protocol, thereby the video call is enabled (S292).

FIG. 3 is a flow chart illustrating a process for providing multimedia contents when an incoming video call is in queue before being answered, according to a second embodiment of the invention, and FIG. 4 shows the configuration of a communication system used in such case.

This embodiment differs from the first embodiment in that a media IP 60 and a subscriber server 65 are provided and that the 3G.324M protocol is established between the media IP 60 and a $MS_T$ 50. Moreover, the subscriber server 65 stores ID information of multimedia content(s), e.g., media code, which an $MS_O$ user has set, and provides the media code to the media IP 60 in response to a query from it. Then the media IP 60 provides the $MS_T$ 50 with multimedia contents corresponding to the code.

The call processing shown in FIG. 3 is partly identical with the aforementioned conventional call processing shown in FIG. 1 for providing a video call over the third generation mobile communication network using the 3G.324M protocol. For example, the processing from step S310, where an $MS_O$ 10 sends an $MSC_O$ 20 a call setup message for establishing the 3G.324M protocol to enable a video call, to step S330, where the $MSC_O$ 20 sends an IAM message to an $MSC_T$ 40 are identical with the aforementioned conventional call processing. Therefore, these steps will not be further explained hereafter.

Meanwhile, at step S320, an O_SFI (Originating_Service Features Indicator) parameter contained in a SRI Request is a parameter that may be used to inform the termination-side network of an originating subscriber's service, so that a processing to provide a called party with a multimedia service may proceed. In case that a subscriber having his or her O_SFI set in VLR (Visitor Location Register) makes an outgoing call, i.e., call origination, the $MSC_O$ 20 transmits a SRI Request including the O_SFI to HLR. As such, a second SRI Request sent under CFU (Call Forwarding Unconditional) service, where all incoming calls are forwarded unconditionally, may contain the O_SFI parameter.

The $MSC_O$ 20 transmits an IAM message to the $MSC_T$ 40 (S330). Here, depending on a video call attempt, the IAM message may include a TMR (Transmission Medium Requirement) parameter specified as 64 kbps, unstructured, and an O_SFI parameter defined to "MultiRing" for identifying an early media service of the invention. In response to the IAM message, the $MSC_T$ 40 sends the media IP 60 an IAM including ID information of the $MS_T$ to which multimedia data needs to be provided (S340).

The media IP 60 sends the $MSC_T$ 40 an address complete message (ACM) indicating the acquisition of $MS_T$ ID (S342), requests to the subscriber server 65 for a media code having been registered by the calling party, the subscriber of the $MS_O$ 10, and receives the media code from the subscriber server 65 (S348). Here, the media code means an identifier of multimedia contents to be transmitted to the $MS_T$ 50.

Next, the $MSC_T$ 40 sends a Paging message to the $MS_T$ 50 according to the IAM from $MSC_O$ (S350), and the $MS_T$ 50 sends a Paging Response to the $MSC_T$ 40 (S352).

Afterwards, the $MSC_T$ 40 sends an incoming Setup message to the $MS_T$ 50 (S360). Again, the incoming Setup message used here includes a ProgressIndicator parameter specified as Request 3G.324M Initiation, which commands to initiate the 3G.324M protocol for a video call.

The $MS_T$ 50 sends the $MSC_T$ 40 a Call Confirmed message (S362) and an Alert message (S370). In addition, the $MS_T$ 50 attempts to establish the H.245 protocol in response to the request for 3G.324M Initiation included in the ProgressIndicator parameter, then a channel based on the H.245 protocol is established between the media IP 60 and $MS_T$ 50 (S374 and S375). Then, based on the H.223 protocol, data transmission/receiving through the channel is achieved between the media IP 60 and the $MS_T$ 50 via the $MSC_T$ 40 (S376 and S377). In this manner, contents having been stored in the media IP 50 are provided to the $MS_T$ 50 through the $MSC_T$ 40.

Meanwhile, the $MSC_T$ 40 sends the $MSC_O$ 20 an address complete message (ACM) indicating the acquisition of $MS_T$ ID (S378), and the $MSC_O$ 20 transmits an Alert message to the $MS_O$ 10 for informing such (S379).

When answering or receiving the call, the $MS_T$ 50 transmits a Connect message to the $MSC_T$ 40 (S380) and receives a Connect Ack (S382).

After receiving the Connect message from the $MS_T$ 50, the $MSC_T$ 40 sends an answer message (ANM) to the $MSC_O$ 20 (S384), then the $MSC_O$ 20 sends a Connect message to the $MS_O$ 10 (S386) and receives a Connect Ack (S388).

In the mean while, when the $MS_T$ 50 answers the call by sending the Connect message at step 380, the 3G.324M channel established between the $MSC_T$ 40 and the $MS_T$ 50 is released (S389-1). In addition, after delivering a circuit release request (REL) message to the media IP 60 (S389-2), the $MSC_T$ 40 receives a reply (RLC) message from the media IP 60 (S389-3), and the channel established between the $MSC_T$ 40 and the media IP 60 is released.

Moreover, once a call is connected between the $MS_O$ 10 and the $MS_T$ 50 (S380-S388), a negotiation on audio and video communication channel setup according to the H.245 protocol is made between the $MS_O$ 10 and the $MS_T$ 50 (S390), then audio and video data for the video call are transmitted using H.223 protocol (S392).

In this embodiment, the $MSC_T$ 40 may include the ProgressIndicator field requesting the initiation of 3G.324M protocol in the Setup message of step S360, according to the multi-ring service request of the O_SFI parameter either in the PRN Request message or in the IAM message of step S340. Moreover, the $MSC_T$ 40 may store O_SFI information in VLR, when the messages received include such information.

As such, to provide multimedia contents in cooperation with an external device such as the media IP 60, the $MSC_T$ 40, along with the media IP 60, should have an interface for connecting or linking each other. For instance, a communication channel may be established by delivering the IAM message to the media IP 60 allocated to routing digits (S340-S342). Specifically, a CallingPartyNumber parameter value of the IAM message may be set to '3G IP RoutingDigits+ originating MSISDN' (S340).

In this embodiment, it was assumed that the media IP 60 stores a sound source of multimedia to be provided to a called party. However, if a content corresponding to a specific media code, i.e., a code for identifying sound source, is not stored in the media server, the media IP 60 may request to a separate content server for a corresponding content, and transmit the content to the $MS_T$ 50.

The terminal of the invention is assumed to be able to process a ProgressIndicator parameter value in the incoming Setup message. In other words, when the incoming Setup message includes the ProgressIndicator parameter and the parameter value turns out to be a Request 3G.324M initiation, the terminal should attempt to establish a channel according to the H.245 protocol. Moreover, in case of receiving an incoming call, the $MS_T$ must send a Connect message and establish a H.245 protocol based channel to the $MS_O$.

In relation with the media IP 60, after a channel is allocated between the $MSC_T$ 40 and the media IP 60 of the invention (S340-S342), a 3G.324M protocol based channel is established between the media IP 60 and the $MS_T$ 50 through the $MSC_T$ 40 (S374-S375).

HLR in the invention sets a multi-ring field value of O_SFI, depending on whether a calling party has subscribed or unsubscribed the multimedia service for providing the $MS_T$ with multimedia data.

FIG. 5 shows the configuration of a communication system used for providing multimedia contents when an incoming call over an IP network is in queue before being answered, according to a third embodiment of the invention.

This embodiment differs from the first embodiment in that an $MS_T$ 50 is connected to a wireless packet network (IP network), so multimedia contents are transmitted to the $MS_T$ over the wireless packet network.

To be more specific, the $MS_T$ 50 is connected to the wireless packet network through an access point (AP) 45 connecting a wireless network with a wired network, and an access point controller (APC) 43 controlling the packet communication. Also, the $MS_T$ is connected with an $MSC_T$ 40 through gateway (G/W) of the APC 43 based on session initiation protocol (SIP) to set a call. In this manner, audio communication and/or data communication is performed between the $MS_O$ 10, connected to a mobile communication network, and the $MS_T$.

FIG. 6 is a flow chart illustrating a process of providing multimedia contents in use of the communication system described above when an incoming call over an IP network is in queue before being answered.

The call processing shown in FIG. 6 is partly identical with the conventional call processing for providing a call over an existing mobile communication network. For example, the processing from step S610, where an $MS_T$ 10 sends an $MSC_O$ 20 a call setup message for enabling a video call, to step S630, where the $MSC_O$ 20 acquires routing information and sends an IAM message to an $MSC_T$ 40 are identical with the aforementioned call processing. Therefore, these steps will not be further explained hereafter.

After the $MSC_O$ 20 transmits an IAM message to the $MSC_T$ 40 (S630), the $MSC_T$ 40 sends an APC 45 a Paging message for the $MS_T$ 50 (S650), and the APC 45 sends the $MS_T$ 50 an SIP Invite Request Message informing an incoming call (S651). Then, the $MS_T$ 50 sends the APC 45 an SIP Confirmed message permitting a call connection (S652), and the APC 45 sends a Paging Response to the $MSC_T$ 40 as a response to the Paging request (S653).

When the $MS_T$ 50 connects to a wireless packet network through the processing described above, multimedia data pre-registered by the calling party, the user of the $MS_O$, is provided from the $MSC_T$ 40 or the media IP (not shown) to the $MS_T$ 50 over the wireless packet network (S676).

In the meantime, the $MSC_T$ 40 sends an address complete message (ACM) notifying the acquisition of the $MS_T$ ID to the $MSC_O$ 20 (S678), and the $MSC_O$ 20 sends the $MS_O$ 10 an Alert message informing such (S679).

When the $MS_T$ 50 receives the call in response to call incoming, it delivers a Connect message to the $MSC_T$ 40 (S680), and receives a Connect Ack message (S682).

Meanwhile, after receiving the Connect message from the $MS_T$ 50, the $MSC_T$ 40 transmits an answer message (ANM) to the $MSC_O$ 20 (S684). Then, the $MSC_O$ 20 sends a Connect message to the $MS_O$ 10 (S686) and receives a Connect Ack message (S688).

When a call is connected between the $MS_O$ 10 and the $MS_T$ 50 as above, an audio or a video call is enabled therebetween (S692).

While the invention has been shown and described with respect to the preferred embodiments, it will be understood by those skilled in the art that various changes and modification may be made without departing from the spirit and scope of the invention as defined in the following claims.

INDUSTRIAL APPLICABILITY

According to the present invention, a mobile communication network protocol for multimedia transmission between a target mobile station and a network is established before a called party receives a call, so that multimedia such as images or moving pictures may be sent to the target mobile station before the called party answers the call. In this way, the called party is able to enjoy a multimedia service before the phone call is connected. Moreover, if the multimedia is an audio, image, or moving picture about a calling party, the called party can identify the calling party based on the multimedia.

The invention claimed is:

1. A method for providing a target mobile station with a multimedia content before the target mobile station answering a call requested from an originating mobile station over a mobile communication system, the method comprising the steps of:
   (a) receiving a call request from the originating mobile station;
   (b) paging the target mobile station and sending an incoming setup message to the target mobile station, wherein the incoming setup message includes a command for initiating a protocol to establish the channel for multimedia transmission between the target mobile station and the mobile communication system;
   (c) establishing a channel for multimedia transmission to the target mobile station by initiating the protocol to establish the channel for multimedia transmission in response to the target mobile station receiving the command included in the incoming setup message;
(d) providing the target mobile station with the multimedia content through the channel for multimedia transmission;
(e) receiving a call answer from the target mobile station, and releasing the channel for multimedia transmission in response to the call answer; and
(f) connecting the call between the target mobile station and the originating mobile station.

2. The method of claim 1, wherein the command for initiating the protocol includes information for identifying the protocol to establish the channel for multimedia transmission.

3. The method of claim 2, wherein the protocol to establish the channel for multimedia transmission is 3G.324M.

4. The method of claim 1, further comprising the step of (g) establishing a channel for video call between the target mobile station and the originating mobile station using 3G.324M protocol, following the step (f).

5. The method of claim 1, wherein the multimedia content includes any of audio data, video data, and image data.

6. The method of claim 1, wherein the step (c) comprises establishing the channel for multimedia transmission between a target mobile switching center and the target mobile station.

7. The method of claim 1, wherein the step (c) comprises establishing the channel for multimedia transmission between an Intelligent Peripheral (IP) and the target mobile station via a target mobile switching center, and wherein the multimedia content is stored in the IP.

8. The method of claim 7, further comprising the step of (h) identifying the multimedia content to provide to the target mobile station by receiving the identification number of the originating mobile station from the target mobile switching center between the step (a) and the step (c).

9. A mobile communication system for providing a target mobile station with a multimedia content before the target mobile station answering a call requested from an originating mobile station, the system comprising:
a target mobile switching center which receives a call request from the originating mobile station and pages the target mobile station; and
a media IP which stores the multimedia content to provide to the target mobile station and operates in cooperation with the target mobile switching center, wherein the target mobile switching center sends an incoming setup message to the target mobile station, the incoming setup message including a command for initiating a protocol to establish a channel for multimedia transmission, and wherein the media IP receives the identification number of the originating mobile station from the target mobile switching center, establishes the channel for multimedia transmission to the target mobile station via the target mobile switching center by initiating the protocol to establish the channel for multimedia transmission in response to the target mobile station receiving the command included in the incoming setup message so as to provide the target mobile station with the multimedia content before the target mobile station answers to the call, and the target mobile switching center releases the channel for multimedia transmission after receiving a call answer from the target mobile station.

10. The mobile communication system of claim 9, wherein the command for initiating the protocol includes information for identifying the protocol to establish the channel for multimedia transmission.

11. The mobile communication system of claim 10, wherein the protocol to establish the channel for multimedia transmission is 3G.324M.

12. The mobile communication system of claim 9, wherein the target mobile switching center connects the call between the target mobile station and the originating mobile station.

13. A mobile switching center for providing a target mobile station with a multimedia content before the target mobile station answering a call requested from an originating mobile station, the mobile switching center conducting the steps of:
(a) receiving a call request from the originating mobile station;
(b) paging the target mobile station and sending an incoming setup message to the target mobile station, wherein the incoming setup message includes a command for initiating a protocol to establish the channel for multimedia transmission to the target mobile station;
(c) establishing a channel for multimedia transmission to the target mobile station by initiating the protocol to establish the channel for multimedia transmission in response to the target mobile station receiving the command included in the incoming setup message;
(d) providing the target mobile station with the multimedia content through the channel for multimedia transmission;
(e) receiving a call answer from the target mobile station, and releasing the channel for multimedia transmission in response to the call answer; and
(f) connecting the call between the target mobile station and the originating mobile station.

14. The mobile switching center of claim 13, wherein the command for initiating the protocol includes information for identifying the protocol to establish the channel for multimedia transmission.

15. The mobile switching center of claim 14, wherein the protocol to establish the channel for multimedia transmission is 3G.324M.

16. The mobile switching center of claim 13, further conducting the step of (g) establishing a channel for video call between the target mobile station and the originating mobile station using 3G.324M protocol, following the step (f).

17. A mobile communication terminal for receiving a multimedia content from a mobile communication system before a call which an originating mobile station requested is connected, the terminal conducting the steps of:
(a) receiving a paging and responding to the paging;
(b) receiving an incoming setup message including a command for initiating a protocol to establish a channel for multimedia transmission;
(c) establishing the channel for multimedia transmission to the mobile communication system, in response to the command for initiating the protocol;
(d) receiving the multimedia content through the channel for multimedia transmission; and
(e) answering the call which the originating mobile station requested, and releasing the channel for multimedia transmission in response to answering the call.

18. The mobile communication terminal of claim 17, wherein the command for initiating the protocol includes information for identifying the protocol to establish the channel for multimedia transmission.

19. The mobile communication terminal of claim 18, wherein the protocol to establish the channel for multimedia transmission is 3G.324M.

20. The mobile communication terminal of claim 17, further conducting the step of (f) establishing a channel for video call to the originating mobile station using 3G.324M protocol, when the call is connected.

21. A method for receiving a multimedia content from a mobile communication system before a call which an originating mobile station requested is connected, the method comprising the steps of:
(a) receiving a paging and responding to the paging;
(b) receiving an incoming setup message including a command for initiating a protocol to establish a channel for multimedia transmission;
(c) establishing the channel for multimedia transmission to the mobile communication system, in response to the command for initiating the protocol;
(d) receiving the multimedia content through the channel for multimedia transmission; and
(e) answering the call which the originating mobile station requested, and releasing the channel for multimedia transmission in response to answering the call.

22. The method of claim 21, wherein the command for initiating the protocol includes an information for identifying the protocol to establish the channel for multimedia transmission.

23. The method of claim 22, wherein the protocol to establish the channel for multimedia transmission is 3G.324M.

24. The method of claim 21, further comprising the step of (f) establishing a channel for video call to the originating mobile station using 3G.324M protocol, when the call is connected.

* * * * *